(12) United States Patent
Sponheim et al.

(10) Patent No.: US 7,058,944 B1
(45) Date of Patent: Jun. 6, 2006

(54) EVENT DRIVEN SYSTEM AND METHOD FOR RETRIEVING AND DISPLAYING INFORMATION

(75) Inventors: Thomas Alan Sponheim, Seattle, WA (US); Kris Owens, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/558,031

(22) Filed: Apr. 25, 2000

(51) Int. Cl.
  *G06F 9/46* (2006.01)
  *G06F 15/16* (2006.01)
  *G06F 7/00* (2006.01)
(52) U.S. Cl. .................. 718/100; 709/203; 707/10
(58) Field of Classification Search ............ 707/1–3, 707/10; 709/1, 100, 102, 104, 105, 200–203; 718/1, 100, 103, 104, 105, 102
  See application file for complete search history.

(56) References Cited

U.S. PATENT DOCUMENTS

| | | | |
|---|---|---|---|
| 5,832,218 A * | 11/1998 | Gibbs et al. ............... | 709/203 |
| 6,031,989 A | 2/2000 | Cordell | |
| 6,035,119 A | 3/2000 | Massena et al. | |
| 6,356,283 B1 * | 3/2002 | Guedalia .................... | 345/760 |
| 6,363,398 B1 * | 3/2002 | Andersen ................... | 707/103 |
| 6,370,552 B1 * | 4/2002 | Bloomfield ................. | 715/513 |
| 6,374,272 B1 * | 4/2002 | Bates et al. ................. | 715/513 |
| 6,539,422 B1 * | 3/2003 | Hunt et al. ................. | 709/217 |
| 6,691,176 B1 * | 2/2004 | Narin et al. ................ | 719/318 |
| 6,708,311 B1 * | 3/2004 | Berstis ....................... | 715/533 |
| 6,775,298 B1 * | 8/2004 | Aggarwal ................... | 370/473 |
| 6,785,869 B1 * | 8/2004 | Berstis ....................... | 715/532 |

* cited by examiner

*Primary Examiner*—Meng-al T. An
*Assistant Examiner*—Syed J Ali
(74) *Attorney, Agent, or Firm*—Amin & Turocy, LLP

(57) ABSTRACT

A system and method are provided for dynamically creating a communications channel at a local computer in response to selecting an element, such as a word or phrase, that is being displayed on an HTML page. A container also is created on the page in response to the element being selected. Data indicative of the selected element and containing environment is submitted to an Active Server Page at a server computer for retrieving information related to the selected element. The retrieved information is sent to the communications channel at the local computer and then displayed in the container on the original page.

39 Claims, 7 Drawing Sheets

EVENT DRIVEN SYSTEM AND METHOD FOR RETRIEVING AND DISPLAYING INFORMATION

TECHNICAL FIELD

The present invention relates to retrieving information and, more particularly, to an event driven system and method for retrieving and displaying information in response to a user selection.

BACKGROUND

Information resources, such as textbooks and technical documentation, often employ glossaries (typically located at the end of the resource) to educate an individual concerning certain terms contained within the resource. Usually the author or an editor of the text determines the extent of the glossary. This concept is being applied with equal abundance relative to computer-related resources, such as the various levels of technical documentation concerning operation and configuring operating systems, hardware, peripherals, etc. Glossaries also are employed in various dictionary and encyclopedia applications, such as CD-ROM or Web-based applications. It is also common to provide glossaries associated with other types of documentation which may be posted on the World Wide Web (the "Web").

For example, many companies post documentation on Web pages to help educate users of their products and/or services. Many pages contain technical terms, some of which the user may not understand. In order for a user to better comprehend certain terms, an online glossary or dictionary may be associated or linked with the particular document set. The glossary usually takes one of two forms.

One type of glossary is in the form of separate page that includes a number terms selected by the document author or another person familiar with the document, with each term being followed by a corresponding definition. However, only a small number of terms usually are provided in the glossary. Consequently, terms not directly pertinent to the subject matter of the document set usually are not provided definitions for the reader. Moreover, since individual glossaries are created for each document set and because different glossaries may share a number of terms, there may be great deal of duplicated efforts and/or inconsistent definitions being provided. Even though a glossary page may be provided, the user may not always know its existence or location. Assuming that an individual is able to find the definition in a glossary page, the individual still must navigate back to originating document to continue reading.

Another type of glossary employs "pop-ups" that appear in response to a user selecting a highlighted word on a document page. In order to provide this functionality, the page author must physically mark each term for which a dictionary definition is to be made available. The author, thus, may mark a given word on one page, but fail to mark the same word on another page. As a greater number of words are marked, an added level of complexity arises related to managing the links to the glossary. In response to a user-selection of a single marked term, it is common for a page author to include within the document the definitions for all of the marked terms on that page. The text of the glossary definitions is usually hidden and only displayed when the user click a highlighted term. As a result, more data than required may be downloaded, thereby slowing down page loading from the server. Because it is impractical and unattractive to mark each word on a page that a user might not understand, only selected terms are marked based on what the author believes will be important to its readers. Consequently, the available glossary for a given page may prove insufficient to meet the needs of each user.

SUMMARY

The present invention relates to an event driven system and method for facilitating retrieval and display of information. A page is displayed at a client and is programmed to be responsive to a user selecting one or more elements displayed on the page. In particular, a container is added to the page in response to a proper selection of at least one element. The container may be moved to a predetermined position relative to the selection and/or display a message to indicate that a response to the selection is being retrieved. A communications channel to a server also is dynamically created at the client in response to the selection. The client employs the communications channel to communicate data to the server indicative of the selection. The server receives the data from the client and sends back to the communications channel at the client response data related to the selected element. Information based on the response data is copied or transferred from the communications channel to the container for display on the page.

In accordance with an aspect of the present invention, the information that is displayed in the container also may be selectable so that, in response to selecting one or more of the container elements, a user may retrieve additional information about one or more selected elements. The retrieval of additional information also may employ the communications channel that was already created.

In accordance with another aspect of the present invention, additional data, such as the URL of the page and/or metadata associated with the displayed page, also may be communicated to the server via the communications channel with the selection. The additional data may be employed, for example, to dynamically select a particular database according to the additional data, which may accompany the selection, communicated to the server. For example, if the system is programmed and configured to implement an active glossary, in accordance with an aspect of the present invention, the server may select an appropriate glossary based on the additional data. The additional data also may be employed by the server to select an appropriate language database and select an appropriate search methodology according to the selected language.

Another aspect of the present invention provides a system for retrieving data. The system includes a client device programmed to create a communications channel in response to selecting an element displayed on a page and to communicate information about the element via the communications channel. The client device displays on the page information based on response data received via the communications channel.

Still another aspect of the present invention provides a system for retrieving data. The system includes a first computer programmed to, in response to selecting at least an element on a page displayed at the first computer, create a communications channel at the first computer and send first data indicative of the selected element via the communications channel. A second computer is operative to receive the first data and is programmed to send to the communications channel response data related to the selected element. The first computer displays on the page information based on the response data.

Another aspect of the present invention provides a method for dynamically retrieving data. The method includes the steps of selecting an element on a page displayed at a first computer and creating at the first computer a channel for communicating information about the element. Data indicative of the selected element is submitted to a second computer via the channel. Response data corresponding to the selected element is, in turn, received at the first computer. Information based on the received data is displayed on the page. The method and other foregoing aspects of the present may be implemented as computer-readable instructions embodied in a computer-readable medium.

To the accomplishment of the foregoing and related ends, the invention, then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed. Other objects, advantages and novel features of the invention will become apparent from the following detailed description of the invention when considered in conjunction with the drawings.

DESCRIPTION OF THE INVENTION

The present invention relates to an event driven system and method for facilitating retrieval and presentation of information, which may be in the form of text, images, audio and/or any other perceivable media. A page, such as a hypertext mark-up language (HTML) page, is displayed at a client and is programmed to be responsive to a user selecting one or more elements displayed on the page. In particular, a container is added to the page in response to a proper selection of at least one page element. The container may be moved to a predetermined position relative to the selection and/or display a message to indicate that a response to the selection is being retrieved. A communications channel to a server also is dynamically created at the client in response to the selection. The client employs the communications channel to communicate data to the server indicative of the selected page element. The server receives the data from the client and sends back to the communications channel at the client response data related to the selected page element. Information based on the response data is transferred from the communications channel to the container for display on the page.

Figure 1A:
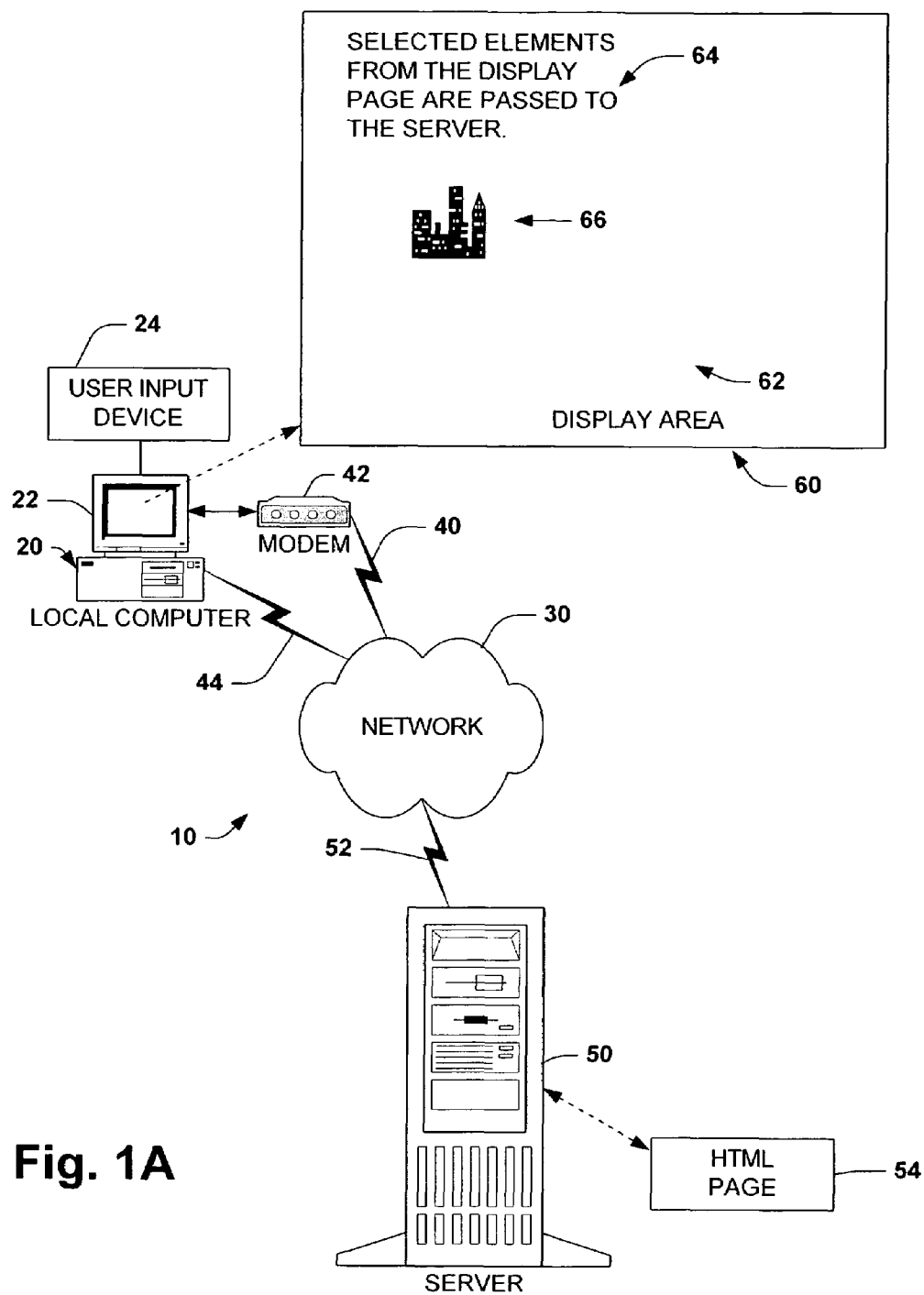
FIG. 1a is a functional block diagram of a system for providing an active glossary in accordance with the present invention.
Figure 1B:
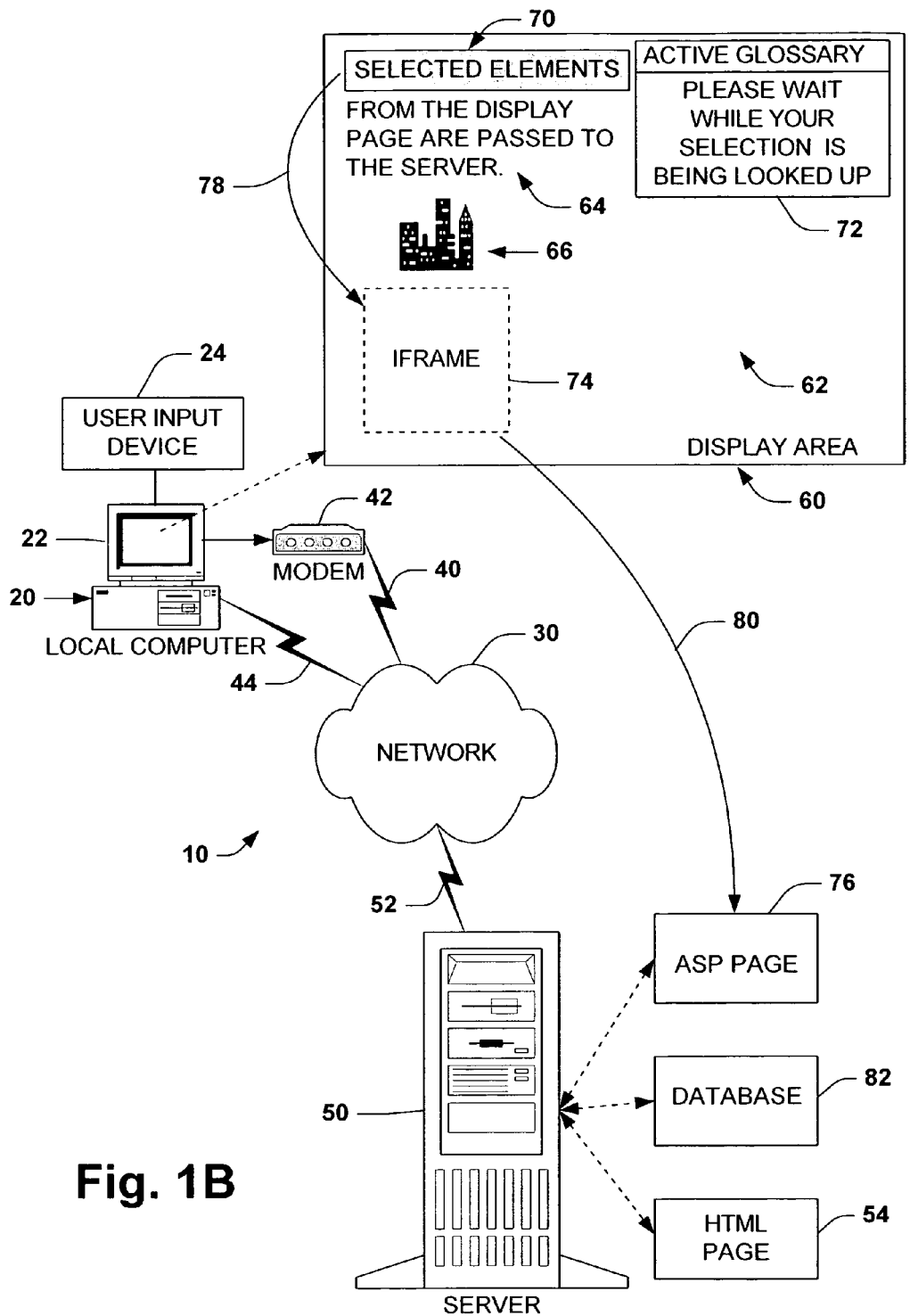
FIG. 1b is a functional block diagram of the system of FIG. 1a, illustrating a second condition of the system in accordance with the present invention.
Figure 1C:
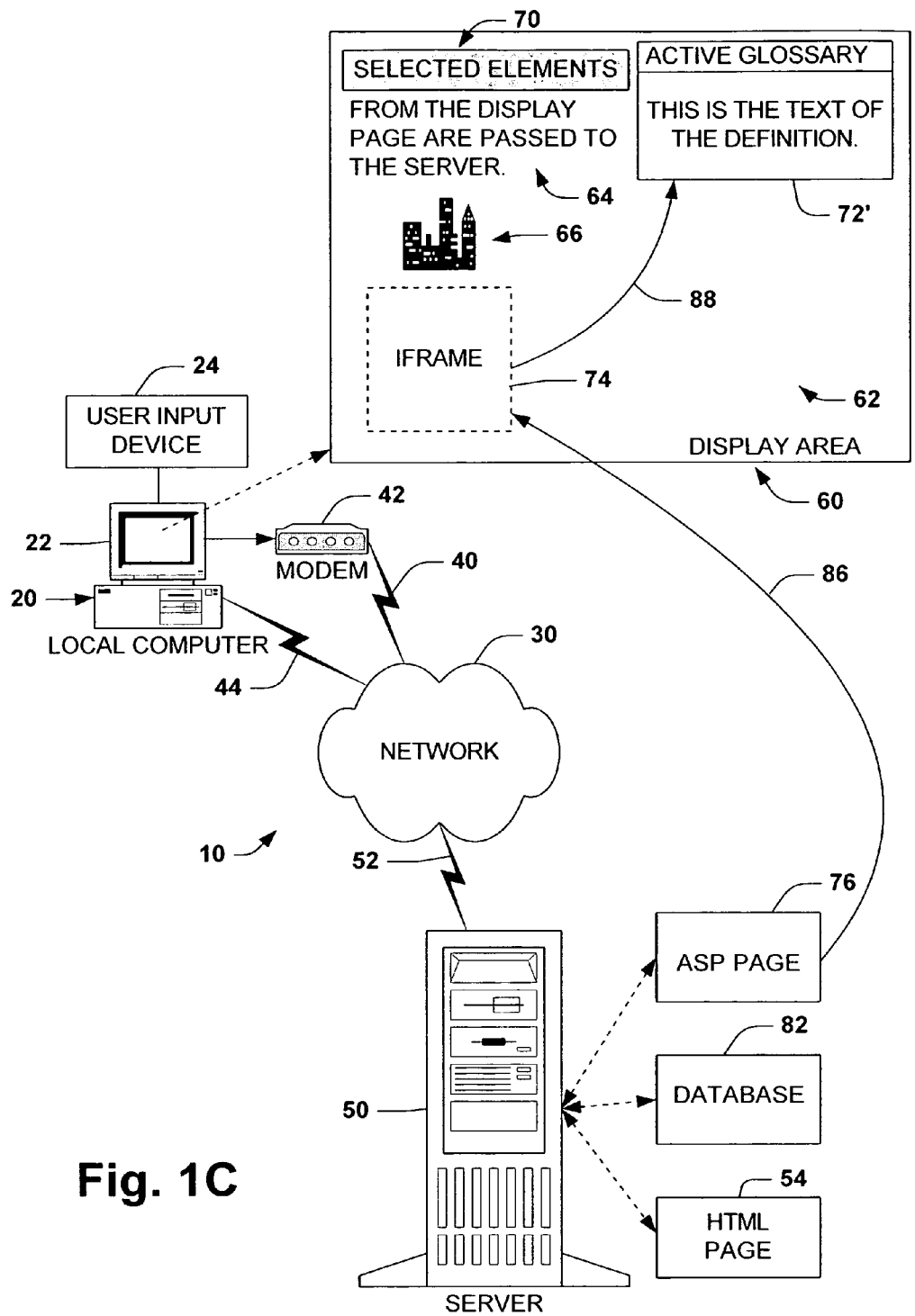
FIG. 1c is a functional block diagram of the system of FIG. 1a, illustrating a third condition of the system in accordance with the present invention.

FIGS. 1a–1c illustrate an example of a browsing environment 10 in which a system, in accordance with the present invention, may be implemented. While the system represented in FIGS. 1a–1c is an active glossary system in accordance with one aspect of the present invention, it will be appreciated that the teachings contained herein are equally applicable to other types of systems and may be implemented in various other environments.

Referring to FIG. 1a, the environment 10 includes a local computer 20 having a display 22 and a user input device 24 through which an individual may interact with the local computer. The user input device 24, for example, may include a keyboard, a pointer device (e.g., a mouse), a voice activated control device, a wireless input device, and/or other equipment or peripherals through which a user may interact with programs running on the local computer 20.

The local computer 20 is operatively coupled to a network 30, such as an Internet, an intranet, or another computer network. The local computer 20 is connected to the network 30, for example, over a telephone line 40 via a modem 42. Alternatively, the local computer 20 may be connected to the network 30 through another connection 44, such as an integrated services digital network (ISDN), T1, DS1 or other high speed telecommunications connections and an appropriate connection device, a television cable and modem, a satellite link, an optical fiber link, an Ethernet or other local area network technology wire and adapter card, radio or optical transmission devices, etc. It is to be appreciated that the invention also may be implemented in a browser environment for other public and private computer networks, such as a computer network of a commercial on-line service or an internal corporate local area network (LAN), an Intranet, or like computer network.

The local computer 20 runs software, including a browser, for unified browsing of electronic documents and other data from local sources as well as from the computer network 30. Specifically, documents for browsing with the browser software may reside as files of a file system stored in appropriate storage devices at the local computer 20 or reside at resources at a remote computer 50. The remote computer 50 is operatively coupled to the network 30 via connection 52, which may be in the form of a telecommunications connection and appropriate device or any other communications link (including wired and wireless) to the network. By way of example, the remote computer 50 is an Internet-based server connected to the computer network 30 to provide one or more World Wide Web ("Web") sites to which the local computer 20 may connect.

By way of example, a document 54 resides at the remote computer 50 that conforms to HTML standards, and may include extensions and enhancements of HTML standards, such as Dynamic HTML (DHTML). It is to be appreciated that the browser software running at the local computer 20 may be capable of browsing documents having other data formats from the local computer or the remote computer 50. In addition, the illustrated document 54 may incorporate other information content, such as graphical images, audio, video, executable programs, etc. In conformance with DHTML standards, each feature of information content on the page 54 (e.g., each word and each image) may be considered an object or element selectable by the user of the local computer 20, such as by employing a the user input device 24 when connected to the Web page associated with the documents 54. The elements and information content of the document 54 are stored in a file system at the remote computer 50. The document at the remote computer 50 incorporates the information using HTML tags and uniform resource locators (URLs) that specify the location of files or other Internet resources containing the images on the network 30.

The browser software running locally on the local computer 20 displays the HTML document 54 in a window 60 or area of the local computer's display 22 allocated to the browser by the operating system. The window 60 includes a document display area 62 and user interface controls (not shown). The browser displays a representation of the document 54 within the document display area 62 of the window 60, although other display types also may be used. The displayed document may include text and/or images corresponding to the document 54. In the example shown in FIG. 1a, the display area 62 includes text 64 that states: "SELECTED INDICIA FROM THE DISPLAY PAGE ARE PASSED TO THE SERVER." An image 66 also is displayed, which in this example is a skyline of a city. It is to be appreciated, however, that the text and/or images being displayed in the display area of the window may exist in any form and may be a combination of text and/or images.

In accordance with an aspect of the present invention, a set of small functions, such as JavaScript functions, is attached to each page on the Web site being displayed through an SRC property of a script tag. As a result, client-side JavaScript code is cached between pages so as to be accessible on any page on the Web site that includes the script tag. The set of functions defines an active glossary function, in accordance with an aspect of the present invention, which is enabled for each page of the Web site being displayed. The active glossary function is event driven and responsive to user-generated events for dynamically creating a back channel to the remote computer. By way of example, the user-generated event may be action from the user input device 24, such as a pointer device (e.g., at a mouse-up event) or a keyboard (e.g., based on predefined keystrokes).

FIG. 1b illustrates a condition in the browsing environment 10 after an individual has selected one or more objects or elements 70 of the page being displayed in the window 60. In this particular example, the selection 70 is the phrase "SELECTED ELEMENTS". Each word in this selection is a separate element. In response to the selection, the active glossary function determines whether the selection is a proper selection for which a retrieval process may be employed. An improper selection, for example, contains only noise words (e.g., "the," "and," prepositions, etc.) or contains more than a predetermined number of terms. If the user makes a proper selection, the active glossary function dynamically inserts a container 72 for enclosing and displaying selected information at a position on the document. For example, the container is an HTML division (DIV) created from a <DIV> tag. The container 72 may enclose another HTML element to which selected style information is to be applied and may be positioned absolutely on the document page. In this example, the container 72 positioned adjacent to the selection 70, as shown in FIG. 1b. Initially, the container 72 may be empty or may contain a message, such as "ACTIVE GLOSSARY PLEASE WAIT WHILE YOUR SELECTION IS BEING LOOKED UP."

The active glossary function also creates a communications back channel through which data indicative of the selected element(s) may be sent and a corresponding response may be received. By way of example, scripting may be employed to create an inline floating frame 74 in response to a proper selection 70. The inline floating frame 74, which provides the back channel, may be created by using an insertAdjacentHTML method to dynamically add an IFRAME tag to the end of the HTML of the current document. The iframe is created and initially added to the page with its SRC attribute empty. The inline floating frame 74 may be completely transparent to the user or it may be configured to be very small (e.g., about one pixel) so as not to be noticeable to a user. A <FORM></FORM> block also is added to the HTML of the current document (e.g., by the insertAdjacentHTML method). The form block provides a mechanism in which selected data may be sent through the inline floating frame.

The active glossary function gathers data indicative of the selection and inserts it into the form block for submission to the remote computer 50. It is to be appreciated that, in addition to the element(s) selected from the display area 62, the active glossary function also may submit a one or more words proceeding the selection, if available, one or more words following the selection, and other data that may be useful in performing a search related to the selection. Such other data may include, for example, the URL of the presently displayed document page, metadata contained in the header of the presently displayed document page, keywords associated with the page, etc. The active glossary function places the data (selection 70 and additional data) into the form and submits such information through the form via the inline floating frame 74 to an Active Server Page (ASP) 76. While in this particular example the data is submitted to an ASP page, it is to be appreciated that any other type of server component may be programmed and/or configured to receive data from the client and communicate the received data with a database on the server (e.g., a Common Gateway Interface (CGI) page can do this).

By way of example, the ASP page is located at the remote computer 50. The ASP page is activated on the server by programmatically causing the form to be submitted to the URL of the ASP page using the iframe's name as the TARGET parameter of the form. The form data is communicated from the local computer 20 to the remote computer 50 through the network 30 and associated communications paths 40, 42, 44, 52. For purposes of illustration, an arrow 78 represents the function of submitting the form to the ASP page on the server via the inline floating frame 74 and another arrow 80 represents the transfer of data from the floating frame to the ASP page 76.

The ASP page 76 includes server-side scripting for processing the data received from the local computer 20 and sending to the local computer an appropriate response based on the received data. The remote computer 50 includes one or more searchable databases 82 that contain, for example, definitions of a plurality of terms and phrases. The database 82 may be in the form of an in-memory dictionary object stored in application scope on the remote computer 50. The dictionary object, for example, contains records corresponding to definitions. The dictionary object is loaded once when the first user hits an ASP page 76, and then remains in memory on the remote computer 50 where it is available for querying according to script code associated with the ASP page. It is to be appreciated that any searchable database structure may be employed without departing from the spirit and scope of the present invention. In addition, a plurality of databases may be implemented with the appropriate database being selected, for example, based on the other data submitted with the selection 70. For example, server-side scripts associated with the ASP page 76 may utilize the URL of the document page and/or associated metadata to select an appropriate language database and/or corresponding scripting for performing a search related to the selection 70. The additional data also may be used to select a primary database. For example, if the word "button" is selected on a page containing the keywords "Microsoft Mouse," then a hardware-oriented glossary may be searched first. Alternatively, if the page includes, for example, keywords "Microsoft Visual Basic," then a software-related glossary would be examined first. In either case, if the search term "button" was not found, the secondary (or fall-through) base glossary would be examined and any hits there would be, in turn, displayed to the user. Accordingly, any number of databases, such as glossaries, may be stacked together to provided secondary, tertiary, etc. searchable levels for each submission. The additional data (URL, Keywords, etc.) also may be employed to select the order in which the databases are searched.

The ASP page 76 is further programmed to take dynamic information from the database 82 and to generate a corresponding HTML page based on the submitted data. The HTML page may include extensions and enhancements of HTML standards, such as DHTML. With reference to FIG. 1c, the ASP page 76 sends response data that includes an HTML page to the local computer 20 through the network 30. The response data loads (invisibly to the user) into the inline floating frame 74. Arrow 86 functionally represents the communication of the response data from the ASP page 76 to the inline floating frame 74. The HTML page also contains client-side scripting (e.g., JavaScript) that causes selected information of the HTML page to be copied from the floating frame 74 into the container 72'. The prime symbol (') illustrates a change in content in the container, as the information based on the response data replaces the original message (FIG. 1b). Because the container 72' was added to the displayed page, the user may continue browsing the current document without having to navigate to a different page to see a definition or reload the current page. The HTML page includes, for example, a definition based on searching the database 82 in response to the selection 70 and other data submitted to the ASP page 76. In accordance with an aspect of the present invention, the information displayed in the container 72 includes selectable elements, such as in conformance with DHTML standards. Therefore, the active retrieval function may be activated in response to a user selecting one or more of the container elements.

If the ASP page 76 is unable to find an exact match for a selection 70, however, additional scripting may be provided to locate one or more meaningful responses or definitions. By way of example, the ASP page 76 may be programmed with server-side scripting to perform additional searches in one or more respective databases based on various word combinations of the selection 70 as well as one or more words (or objects) adjacent to the selection 70, which may be submitted along with the selection. The adjacent words may help provide a context for the selection 70 and, therefore, facilitate retrieval of a meaningful definition. The preceding word or the following word may, for example, be appended to the selection 70 for an additional search. The ASP page 76 also may concatenate the preceding word, the selection 70, and the following word. According to the example of FIG. 1b, the element "FROM" may be sent with the selection as the following term. Because "SELECTED" is the first term on the display page, however, there are no preceding terms relative to the selection 70. Additional scripting may be provided to, based on the number of terms contained in the selection, search the database 82 by looping through combinations of selected terms from the selection 70 until all subgroup combinations and each individual term have been searched.

At any point, if any of the aforementioned adjustments to the search string does not result in a match in the database(s), appropriate scripting also may be implemented at this point to account for word variations, such as plural terms, past, present, and future tenses, etc.

If, after going through the available search rules, and no hits are located for the selection 70, the original selection is used to locate all of the terms in the glossary that have the selected text as a substring within the characters of the term. Pertinent resulting hits may then be sent to the inline floating frame 74 and, in turn, to the container 72' (FIG. 1c), as described above. The user then may select an appropriate definition, make another selection from within the container to initiate another search for that selection, or continue reading the original text 64.

It is to be appreciated that the foregoing description of search implementations are examples of possible implementations and that those skilled in the art may endeavor to provide additional and/or different search capabilities associated with a particular glossary function. In addition, it is to be appreciated that different databases and/or scripting may be required for international and different language implementations of an active glossary, all of which may be implemented in accordance with the present invention. As mentioned above, a particular set of scripting rules may be employed based on other data (URL, metadata, keywords, etc.) that accompanies the selection 70.

It is also to be appreciated that the ASP page and databases may be implemented solely within the local computer, at a plurality of remote computers or at a combination of the local computer and remote computers. While in the example of FIGS. 1a–1c the selection contains text only, it is to be appreciated that images or a combination of text and images may, in accordance with the present invention, be selected and submitted to an appropriate search mechanism.

Figure 2:
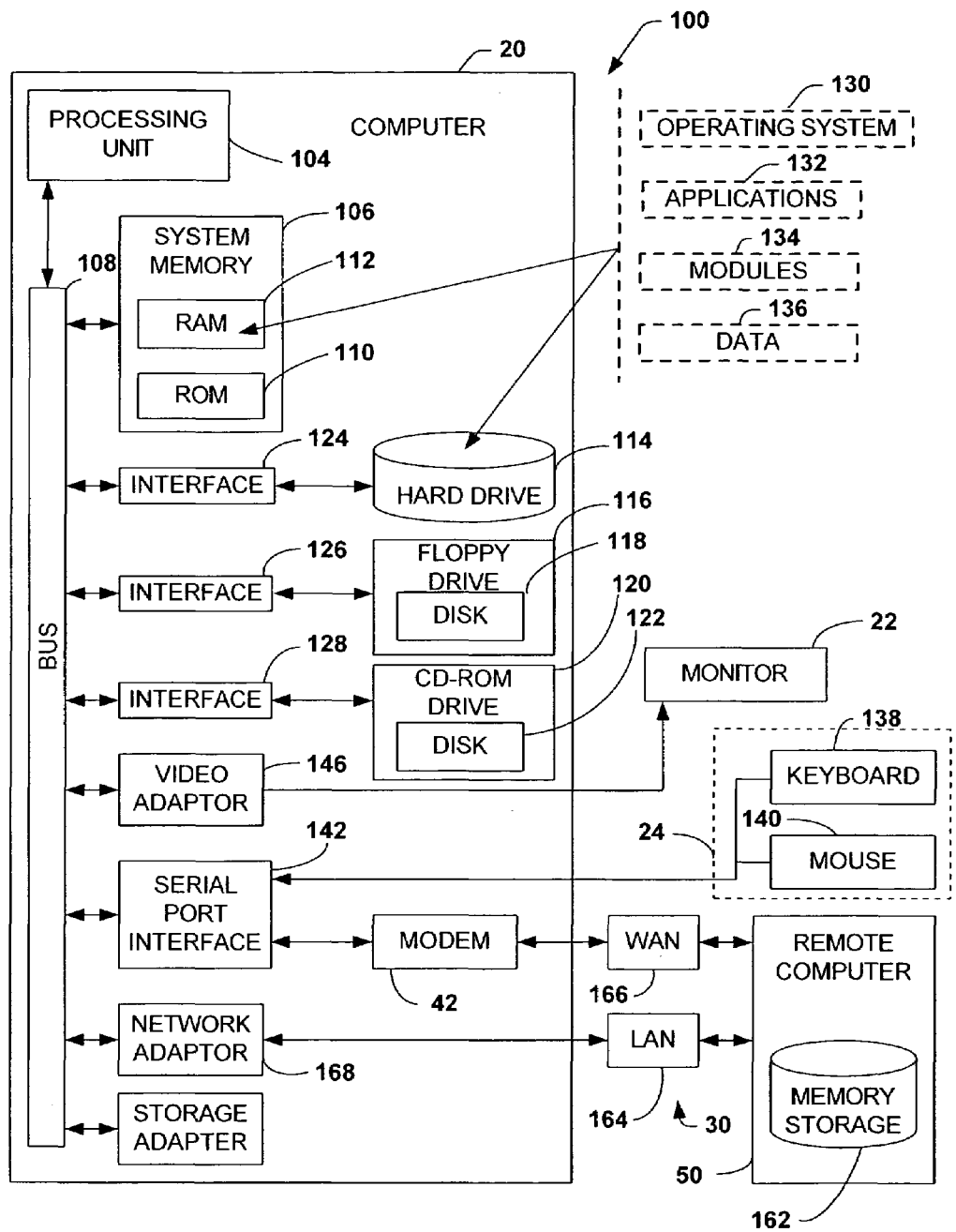
FIG. 2 is a block diagram of an exemplary operating environment for a system configured in accordance with the present invention.

In order to provide additional context for the various aspects of the present invention, FIG. 2 and the following discussion are intended to provide a brief, general description of a suitable computing environment 100 in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in both local and remote memory storage devices.

With reference to FIG. 2, an exemplary system environment 100 for implementing the various aspects of the invention includes a conventional computer 20, including a processing unit 104, a system memory 106, and a system bus 108 that couples various system components including the system memory to the processing unit 104. The processing unit 104 may be any of various commercially available processors, including but not limited to Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also may be used as the processing unit 104.

The system bus 108 may be any of several types of bus structure including a memory bus or memory controller, a peripheral bus, and a local bus using any of a variety of conventional bus architectures such as PCI, VESA, Microchannel, ISA, and EISA, to name a few. The system 100 memory includes read only memory (ROM) 110 and random access memory (RAM) 112. A basic input/output system (BIOS), containing the basic routines that help to transfer information between elements within the computer 20, such as during start-up, is stored in ROM 110.

The computer 20 also may include, for example, a hard disk drive 114, a magnetic disk drive 116, e.g., to read from or write to a removable disk 118, and an optical disk drive 120, e.g., for reading a CD-ROM disk 122 or to read from or write to other optical media. The hard disk drive 114, magnetic disk drive 116, and optical disk drive 120 are connected to the system bus 108 by a hard disk drive interface 124, a magnetic disk drive interface 126, and an optical drive interface 128, respectively. The drives and their associated computer-readable media provide nonvolatile storage of data, data structures, computer-executable instructions, etc. for the computer 20. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment 100, and further that any such media may contain computer-executable instructions for performing the methods of the present invention.

A number of program modules may be stored in the drives and RAM 112, including an operating system 130, one or more application programs 132, other program modules 134, and program data 136. The operating system 130 in the illustrated computer is, for example, the "MICROSOFT WINDOWS NT®" operating system available from Microsoft Corporation, although it is to be appreciated that the present invention may be implemented with other operating systems or combinations of operating systems.

A user may enter commands and information into the computer 20 through one or more user input devices 24, such as a keyboard 138 and a pointing device (e.g., a mouse 140). Other input devices (not shown) may include a microphone, a joystick, a game pad, a satellite dish, a scanner, or the like. These and other input devices are often connected to the processing unit 104 through a serial port interface 142 that is coupled to the system bus 108, but may be connected by other interfaces, such as a parallel port, a game port or a universal serial bus (USB). A monitor 22 or other type of display device is also connected to the system bus 108 via an interface, such as a video adapter 146. In addition to the monitor, a computer typically includes other peripheral output devices (not shown), such as speakers, printers etc.

The computer 20 may operate in a networked environment using logical connections to one or more remote computers, such as a remote computer 50. The remote computer 50 may be a workstation, a server computer, a router, a peer device or other common network node, and typically includes many or all of the elements described relative to the computer 20, although, for purposes of brevity, only a memory storage device 162 is illustrated in FIG. 2. The logical connections depicted in FIG. 2, which may correspond to the network 30 of FIGS. 1a–1c, include a local area network (LAN) 164 and a wide area network (WAN) 166. Such networking environments are commonplace in offices, enterprise-wide computer networks, intranets and the Internet.

When used in a LAN networking environment, the computer 20 is connected to the local network 164 through a network interface or adapter 168. When used in a WAN networking environment, the computer 20 typically includes a modem 166, or is connected to a communications server on the LAN, or has other means for establishing communications over the WAN 166, such as the Internet. The modem 42, which may be internal or external, is connected to the system bus 108 via the serial port interface 142. In a networked environment, program modules depicted relative to the computer 20, or portions thereof, may be stored in the remote memory storage device 162. It will be appreciated that the network connections shown are exemplary and other means of establishing a communications link between the computers 20 and 50 may be used.

In accordance with the practices of persons skilled in the art of computer programming, the present invention has been described with reference to acts and symbolic representations of operations that are performed by a computer, such as the computer 20 or remote computer 50, unless otherwise indicated. Such acts and operations are sometimes referred to as being computer-executed. It will be appreciated that the acts and symbolically represented operations include the manipulation by the processing unit 104 of electrical signals representing data bits which causes a resulting transformation or reduction of the electrical signal representation, and the maintenance of data bits at memory locations in the memory system (including the system memory 106, hard drive 114, floppy disks 118, CD-ROM 122, and shared storage system 110) to thereby reconfigure or otherwise alter the computer system's operation, as well as other processing of signals. The memory locations where such data bits are maintained are physical locations that have particular electrical, magnetic, or optical properties corresponding to the data bits.

Figure 3:
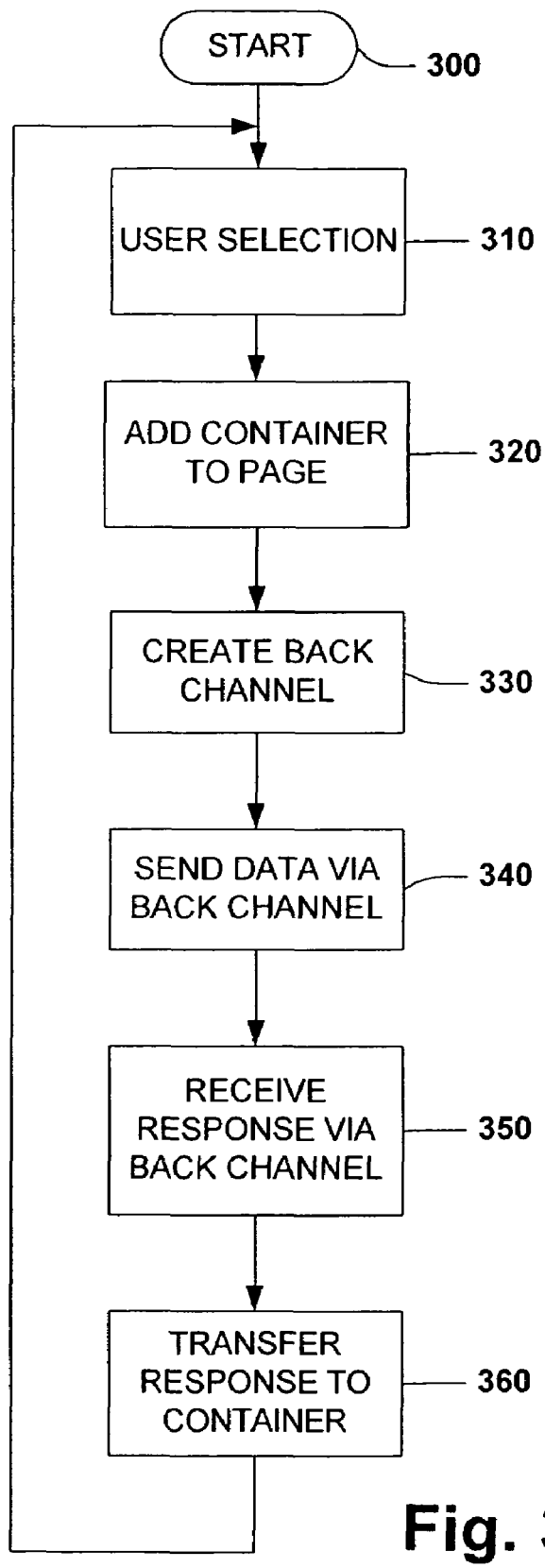
FIG. 3 is a basic flow diagram illustrating a client-side methodology for retrieving data in accordance with the present invention.
Figure 4:
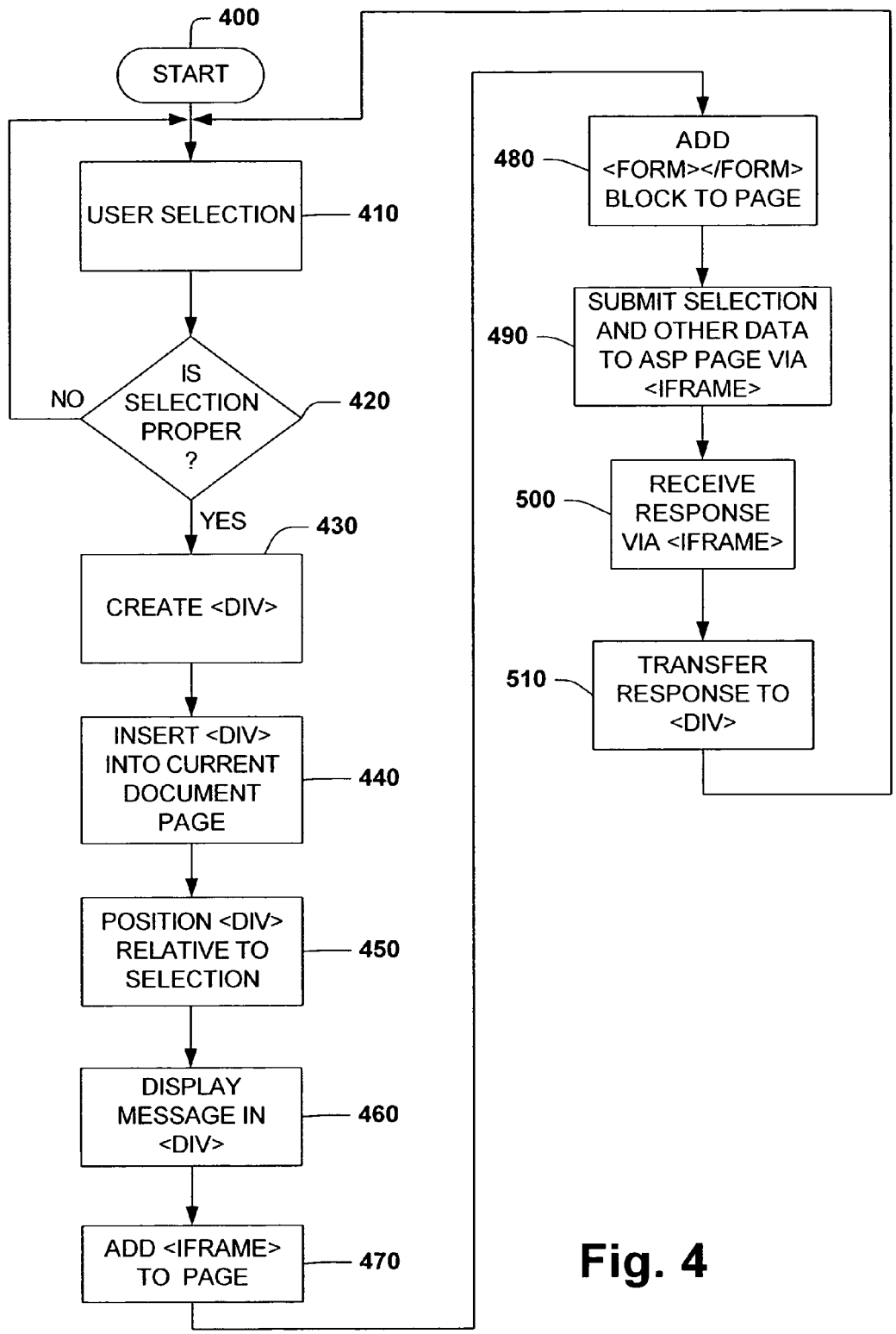
FIG. 4 is another flow diagram illustrating, in greater detail, a client-side methodology for retrieving data in accordance with the present invention.

In view of the exemplary operating environments shown and described above, a methodology, which may be implemented in accordance with the present invention at a client computer, will be better appreciated with reference to the flow diagrams of FIGS. 3 and 4. In particular, FIG. 3 is a flow diagram illustrating a basic methodology of a process implemented at a client computer and FIG. 4 is a flow diagram illustrating a similar methodology with some additional implementation details. While, for purposes of explanation, the methodology is shown and described as a series of steps with respect to flow diagrams, it is to be understood and appreciated that the present invention is not limited by the order of steps, as some steps may, in accordance with the present invention, occur in different orders and/or concurrently with other steps from that shown and described herein. Moreover, not all illustrated steps may be required to implement a methodology in accordance with the present invention.

Referring now to FIG. 3, the process begins at step 300 in which a client-side script is employed at the client computer so as to, in accordance with the present invention, enable operation of an active retrieval function associated with a document page being displayed. With the script running at the client-side, the process proceeds to step 310 in which a selection of one or more elements (text, image, etc.) is made. As mentioned above, the selection may be made with any appropriate user input device, such as a keyboard, a pointing device, or other suitable input device. The process then proceeds to step 320 in which a container is added to the current page being displayed. An appropriate message, such as to indicate that the selection is being looked up, may be displayed in the container. From step 320, the process proceeds to step 330.

At step 330 a back channel is dynamically created for communicating selected data in response to the user selection (step 310). Next, at step 340, selected data, including data indicative of the user selection, is sent through the back channel. The selected data, for example, may be submitted to a searchable offline database at a remote computer. It is to be appreciated that the data also may be submitted through the back channel to an appropriate database locally on the client computer. In addition to the selection, the submitted data may include terms or objects preceding and following the user selection. Additional data (metadata, URL, keywords, etc.) also may be submitted with the selection data through the back channel to facilitate processing of the submission.

From step 340, the process proceeds to step 350 in which response data is received at the client computer via the back channel. The response data may contain information that describes the selection, such as in the form of an HTML page having a definition corresponding to the selection. Alternatively, the response data may include information identifying a list of possible alternative choices that are provided via the back channel from which user may choose an appropriate selection with the input device.

Next, at step 360, at least part of the received response data is copied or transferred from the back channel into the container that was created back at step 320. In order to implement step 360, the response data may include computer-executable instructions to program the client computer the copy or transfer selected response information from the back channel to the container. In a situation when a message is currently displayed in the container, the response may replace the previous message, although a separate container alternatively could be created for the response information. After the response is transferred and displayed in the container, the process returns to step 310. Accordingly, the user may select another phrase or term on the current page. Alternatively or additionally, the user may select a term (or object) from the response presently displayed in the container. In this way, a plurality of cascading containers or windows may be provided, with each subsequent window corresponding to a selection made in a previous container. A container may be removed, for example, in response to a user clicking anywhere outside the container or close the window via an appropriate user input device.

FIG. 4 is an example of a flow diagram illustrating a methodology for implementing a client-side active glossary, in accordance with an aspect of the present invention. The process begins at step 400 in which an event driven client-side script is activated. An example script block that may be implemented at the client computer to initiate an active glossary function is as follows:

<script src="/MyVroot/activeglossary/activeglossary.js" language="JavaScript"></script>

Advantageously, other client-side elements may be written to the page dynamically, as described in greater detail below. The process proceeds to step 410 in which a user selection is made. The user selection, for example, may be made with any suitable user input device, such as a keyboard, a pointer device (mouse), etc. By way of example, the script may respond to a mouse-up event after one or more terms have been selected with a mouse directly on a current Web page. It is to be appreciated that in addition to clicking and dragging over selected portions of the page, double-clicking on a single word or object may make a selection.

From step 410, the process proceeds to step 420 in which a determination is made as to whether the selection is proper. If the selection is not proper, the process returns to step 410. An improper selection, for example, is one that includes only noise words such as "the", "an", prepositions, etc. or if the selection contains more than a predetermined number of words. An improper selection may be ignored, with the process returning to step 410. If the selection is within the programmed constraints (e.g., a proper selection), the process proceeds to step 430. At step 430, a container, such as document division (DIV), is created. As mentioned above, a DIV is itself an HTML document that is displayed in the same browser window as another page. Next, the process proceeds to step 440 in which the DIV is inserted into the HTML of the current document page. It also may be desirable to position the DIV at a preselected position (adjacent) relative to the selection (step 450). From step 450, the process proceeds to step 460 in which a message is displayed in the DIV. The message may indicate, for example, that the selection is being looked up and information pertaining to the selection will be displayed shortly (see, e.g., FIG. 1b).

From step 460, the process proceeds to step 470, in which an inline floating frame (e.g., an <IFRAME> tag) is dynamically added to the HTML of the page. This may be implemented, for example, by script that employs an appropriate insertAdjacentHTML method to add an IFRAME block to the present page (e.g. immediately after the end of the page). The inline floating frame provides a back channel to a database. Advantageously, the IFRAME may be substantially invisible to the user, such as by creating an IFRAME of a single pixel or a transparent IFRAME. At step 480, a form block (e.g. <FORM> . . . </FORM>) also is dynamically added to the document, such as by using an insertAadjacentHTML method. It is to be appreciated that the same scripting may be employed to add the form block and IFRAME to the document page. The process then proceeds to step 490.

At step 490, the selection and other data is submitted to the ASP page via the IFRAME. Specifically, the active glossary function gathers the selection, a word preceding the selection (if available), and a word following the selection. The gathered terms as well as other data, such as a URL, metadata are, in turn, submitted through the form via the IFRAME to the ASP page. In response to data submitted via the IFRAME, the ASP page executes server-side scripts to search one or more associated databases having a plurality of glossary entries. The ASP page also includes server-side scripts that are used to dynamically generate an HTML page in response to the selection and other data submitted to the ASP page. For example, the ASP page takes information from an appropriate database, formats it into standard HTML, and sends the formatted HTML page to the IFRAME at the client computer.

At step 500, response data is received at the IFRAME that includes the formatted HTML page sent by the ASP page, including information obtained from the database. The HTML page received at the IFRAME also contains scripting which, at step 510, causes the definition and/or other information to be transferred or copied from the IFRAME to the DIV, which was created at step 430. If the user is satisfied with the definition, he may simply continue browsing the currently displayed document and may cause additional definitions to be retrieved by selecting one or more page elements in a manner similar to that stated above (step 410). Alternatively, if the user does not understand a term or phrase being displayed in the DIV, the user may select that term or phrase. As a result of making a proper selection within the DIV, additional communication may occur via the IFRAME that was already created, such as to query the database for one or more corresponding definitions. Accordingly, the client computer may create a plurality of cascading windows (DIVs) of information, such as when a user selects one or more terms (or other elements) from other containers.

Figure 5:
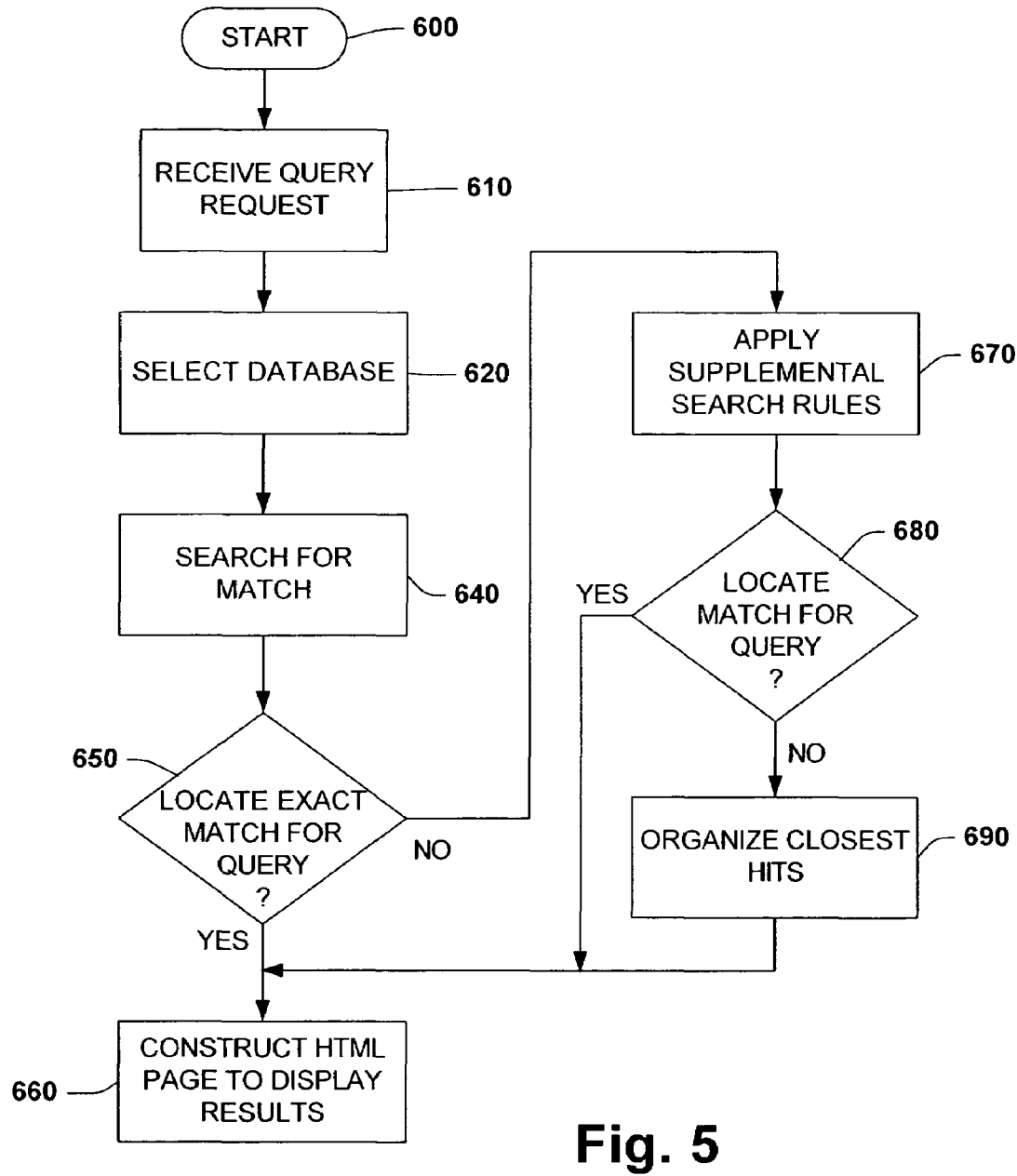
FIG. 5 is a flow diagram illustrating a server-side methodology for providing a response to a client-side inquiry in accordance with the present invention.

FIG. 5 is an example of a methodology, which may occur at the server-side computer in response to an active glossary request. The process starts at step 600 in which the server system is initialized. Next, the process proceeds to step 610 in which a query request is received from a client-side script calling an ASP page on the server. At step 620, the ASP page executes script to select a database. As mentioned above, other data (URL, metadata, keywords, etc.) may be submitted along with a selection to facilitate selection of an appropriate database. For example, metadata of an HTML document may contain product or technology descriptors that may be used to select a glossary database. In addition, the URL data and/or other metadata may indicate the language being viewed at the client computer, so that a corresponding language database and search rules may be employed.

The process proceeds to step 640 in which a search is performed based on the query. This is implemented, for example, based on server-side scripts that control searching based on data received at step 610. The database, for example, may correspond to an dictionary object that is stored in application scope at the remote computer. Appropriate scripting is provided to search the dictionary object based on data submitted with the query request. The process then proceeds to step 650.

At step 650, a determination is made as to whether an exact match for the query has been located. If the determination is affirmative, the process proceeds to step 660 in which an HTML page is constructed for displaying the search results. The HTML page, for example, includes one or more glossary definitions corresponding to data submitted with the query. The HTML page also includes scripting for causing the returned HTML page to be copied or transferred from an inline floating frame (which called the ASP page) to a corresponding container (e.g., DIV) at the client computer. If the determination at step 650 is negative, indicating that an exact match was not located, the process proceeds to step 670.

At step 670, supplemental search rules and clean-up rules may be employed for performing additional searching, such as manipulating and/or reorganizing data submitted with the query request. By way of example, the query request includes a selected word or phrase as well as adjacent terms or objects submitted with the query. The additional search rules may include appending a preceding word to the selection, appending the following word to the selection. The preceding word, the selected phrase, and the following word also may be concatenated form an appropriate search string. If an appropriate match still is not located, the elements that comprise the selection also may be looped through in various groupings. For example, a selection containing five words could be divided into two unique four-word groupings (word1+word2+word3+word4 and word2+word3+word4+word5). Each of these substrings could then be looked up in the database to see if one of these substrings corresponds to an item. The same process may then be perform using three-word groups, etc. In this manner, the most specific terms that may embedded within the selection are encountered first, yielding a more useful information for the user. Each time a database query is made and no hit occurs, additional rules also may be employed on the selection to account for other word variations that may exist, such as plural, tense, and other inflectional endings according to the particular language of the selection. The language-based clean-up rules, for example, may be implemented based on the other data that accompany the selected word or phrase and may be associated with the database being searched. As mentioned above, the other data may include the URL of the page from which the selection was made as well as metadata contained in a header of the page, keywords associated with the page, etc.

From step 670, the process proceeds to step 680 in which a determination is made as to whether the supplemental search rules result in any relevant hits for the query. In the event that one or more relevant hits have been located based on the supplemental search rules, the process proceeds to step 660 in which an HTML page is created for the search results along with appropriate client-side scripting for transferring selected information from the IFRAME to the DIV, which may be adjacent to the selection. If the determination at steps 680 is negative, the process proceeds to step 690. At step 690, the closest hits are organized in an appropriate manner and the process proceeds to step 660 in which an HTML page is constructed to display information identifying the closest hits in a usable format. This enables the user to select from among the displayed hits to find a definition or other helpful information.

While the foregoing example has been described mainly with respect to an active glossary for searching textual terms or phrases, it is to be appreciated that any elements or objects may be selected from a page. If an image were selected at a client computer, scripting may be provided to collect and submit, for example, a filename of the image and/or other attributes associated with the selected image. Appropriate scripting also would be associated with the ASP page for implementing the search and sending information in the form of an HTML page that contains information about the submitted selection. Moreover, the resource on the Web server, which in this example is an ASP page, or scripting associated therewith may be programmed to call another server resource (e.g., another ASP page) or database if, based on the submitted data query or preliminary search results, it is determined that the requested information is not available from the present database but appears to be of a type stored in other ASP page or database.

Because, according to an aspect of the present invention, each element in the displayed page is selectable, a page developer is not required to mark any terms, thereby facilitating page development. Accordingly, there is no subjective marking of terms on a page by the developer, thereby providing greater accessibility to information about elements on a page. In addition, a common global database of term and/or phrases may be accessed by multiple document sets by including appropriate scripting on the server resource (e.g., the ASP page), such as provided herein, to become associated with the global database. A global database, thus, helps remove unnecessary redundancy or inconsistency that might exist from a large number of separate glossaries. Moreover, download time may be reduced as a system and method, in accordance with the present invention, only needs to return pertinent information about a user's selection.

What has been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system for retrieving data, comprising:
    a client device programmed to create a communications channel in response to selecting an element displayed on a page and to communicate information about the element via the communications channel, the client device displaying on the page definitional information related to the selected element based on response data received via the communications channel; the creation of the communications channel is event driven and responsive to at least one user-generated event, the response data received via the communications channel dynamically programs the client device to at least one of copy and transfer at least some of the response data to a container for displaying the definitional information, and the definitional information displayed in the container further includes selectable container elements.

2. The system of claim 1, the client device is programmed to create a container on the page in response to the element being selected, the container being used to display the definitional information based on response data received via the communications channel.

3. The system of claim 1, the response data received via the communications channel programs the client device dynamically to display the definitional information on the page.

4. The system of claim 1, the client device is programmed to create the container on the page in response to the element being selected.

5. The system of claim 4, the container is positioned adjacent to the selected element.

6. The system of claim 1, in response to selecting at least one container element, the client device is further programmed to communicate via the communications channel information about the at least one container element.

7. The system of claim 1, the communications channel is an inline floating frame programmed to access a resource on a server.

8. The system of claim 7, the resource on the server is an Active Server Page associated with a database.

9. The system of claim 1, the information about the element includes at least one of a uniform resource locator and metadata associated with the displayed page.

10. The system of claim 1, the selected element includes at least one word.

11. The system of claim 1, the displayed page further includes a plurality of selectable elements and the selected element includes at least one of the selectable elements.

12. A system for retrieving data, comprising:
    a first computer programmed to, in response to selecting at least one element on a page displayed at the first computer, create a communications channel at the first computer and send first data indicative of the selected element via the communications channel; wherein the creation of the communications channel is event driven and responsive to at least one user-generated event; and
    a second computer operative to receive the first data, the second computer being programmed to send to the communications channel response data related to the selected element, the first computer displays on the page definitional information relating to the at least one selected element based on the response data, the first computer is further programmed, in response to the element being selected, to create a container on the page, the container being employed to display the definitional information based on the response data, the definitional information displayed in the container further includes selectable container elements.

13. The system of claim 12, in response to selecting at least one container element, the first computer is further programmed to communicate to the second computer via the communications channel information about the at least one container element.

14. The system of claim 12, the response data contains computer-executable instructions for programming the first computer dynamically to display the definitional information on the page based on the response data.

15. The system of claim 14, the computer-executable instructions further program the first computer to at least one of copy and transfer at least some of the response data to a container for displaying definitional information on the page relative to the selected element based on the at least some of the response data.

16. The system of claim 15, in response to the element being selected, the first computer is programmed to create the container on the page.

17. The system of claim 16, the container is positioned adjacent to the selected element.

18. The system of claim 12, the communications channel includes an inline floating frame programmed to access a resource at the second computer.

19. The system of claim 18, the resource at the second computer is an Active Server Page associated with a database.

20. The system of claim 12, wherein the first data further includes at least one of a uniform resource locator and metadata associated with the page displayed at the first computer.

21. The system of claim 12, the selected element includes at least one word.

22. The system of claim 12, the page displayed at the first computer further includes a plurality of selectable elements, the selected element including at least one of the plurality of selectable elements.

23. A computer-readable medium having computer-executable instructions for performing acts comprising:
    creating a channel at a first computer for communicating information in response to selecting an element on a displayed page; creating the channel is event driven and responsive to at least one user-generated event;
    submitting to a second computer via the channel data indicative of the selected element;

receiving at the first computer from the second computer data corresponding to the selected element via the channel; and creating a container on the displayed page in response to the element being selected and displaying definitional information in the container based on the received data, the definitional information displayed in the container further includes selectable container elements, the computer-readable medium having further computer-executable instructions for, in response to selecting at least one container element, submitting to the second computer via the channel information about the at least one container element.

24. The computer-readable medium of claim 23, the received data further includes computer-executable instructions dynamically programming the first computer to display the definitional information on the displayed page.

25. The computer-readable medium of claim 24, the received data further includes computer-executable instructions for dynamically programming the first computer to at least one of copy and transfer at least some of the received data from the channel to a container for displaying on the page definitional information based on at least some of the received data.

26. The computer-readable medium of claim 25 having further computer-executable instructions for creating the container on the displayed page of the first computer in response to the element being selected.

27. The computer-readable medium of claim 23, the channel is an inline floating frame programmed to access a resource at the second computer.

28. The computer-readable medium of claim 27, the resource at the second computer is an Active Server Page.

29. The computer-readable medium of claim 23, the data indicative of the selected element further includes at least one of a uniform resource locator and metadata associated with the displayed page.

30. The computer-readable medium of claim 23, the displayed page further includes a plurality of selectable elements, the selected element including at least one of the selectable elements.

31. A method for dynamically retrieving data, comprising:
selecting an element on a page displayed at a first computer;
creating at the first computer a channel for communicating information about the element, creating the channel is event driven and responsive to at least one user-generated event;

submitting to a second computer data indicative of the selected element via the channel;

receiving at the first computer response data corresponding to the selected element;

creating a container on the displayed page in response to the element being selected;

displaying definitional information relating to the selected element within the container based at least in part on the received data, the definitional information displayed in the container further includes selectable container elements.

32. The method of claim 31, further including, in response to selecting at least one container element, sending to the second computer via the channel data indicative of the at least one container element.

33. The method of claim 32, the received data further includes computer-executable instructions for dynamically programming the first computer to display the definitional information on the displayed page.

34. The method of claim 33, the received data further includes computer-executable instructions for dynamically programming the first computer to at least one of copy and transfer at least some of the received data from the channel to a container for displaying on the page definitional information based on at least some of the retrieved data.

35. The method of claim 34, further including creating the container on the displayed page of the first computer in response to the element being selected.

36. The method of claim 31, the channel is an inline floating frame programmed to access a resource at the second computer.

37. The method of claim 36, the resource at the second computer is an Active Server Page associated with a database.

38. The method of claim 31, the data indicative of the selected element further includes at least one of a uniform resource locator and metadata associated with the displayed page.

39. The method of claim 31, the displayed page further includes a plurality of selectable elements, the selected element including at least one of the selectable elements.

* * * * *